United States Patent
Brenner et al.

(10) Patent No.: US 7,308,690 B2
(45) Date of Patent: Dec. 11, 2007

(54) SYSTEM AND METHOD TO IMPROVE HARVESTING OF ZOMBIE PROCESSES IN AN OPERATING SYSTEM

(75) Inventors: Larry Bert Brenner, Austin, TX (US); Luke M. Browning, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 739 days.

(21) Appl. No.: 10/460,537

(22) Filed: Jun. 12, 2003

(65) Prior Publication Data

US 2004/0255299 A1 Dec. 16, 2004

(51) Int. Cl.
*G06F 13/14* (2006.01)
*G06F 9/06* (2006.01)
*G06F 9/40* (2006.01)

(52) U.S. Cl. .................. 719/320; 719/310; 719/318

(58) Field of Classification Search ............... 718/102; 719/310, 318, 320
See application file for complete search history.

(56) References Cited

U.S. PATENT DOCUMENTS

| | | | |
|---|---|---|---|
| 6,275,857 B1 | 8/2001 | McCartney | 709/226 |
| 6,480,877 B1 | 11/2002 | O'Donnell et al. | 709/100 |
| 6,496,850 B1 | 12/2002 | Bowman-Amuah | 709/203 |
| 2002/0089508 A1 | 7/2002 | Sowizral et al. | 345/522 |
| 2003/0037290 A1* | 2/2003 | Price et al. | 714/38 |

OTHER PUBLICATIONS

Mauro, Jim and McDougall, Richard. Solaris Internals: Core Kernel Components. Prentice Hall, 2000.*
Bovet, Daniel P. and Cesati, Marco. Understanding the Linux Kernel. O'Reilly Publishing, 2000.*
John S. Quarterman, Abraham Silberschatz, and James L. Peterson. 4.2BSD and 4.3BSD as examples of the UNIX system. ACM Computing Surveys. vol. 17, Issue 4 (Dec. 1985).*
U.S. Appl. No. 09/548,594, filed Apr. 13, 2000, MacPhail.

* cited by examiner

*Primary Examiner*—William Thomson
*Assistant Examiner*—Richard Pantoliano, Jr.
(74) *Attorney, Agent, or Firm*—VanLeeuwen & VanLeeuwen; John D. Flynn (57) ABSTRACT

A system and method is provided for using a kernel exit routine, performed when a parent process exits, to efficiently remove zombie child processes. The kernel exit routine also re-parents active child processes to a standard system process, such as the init process. When the kernel exit routine re-parents the active child process to the init process, the child process is flagged indicating that the child's original parent process has already exited. A kernel routine, such as the swapper process, periodically cleans up flagged processes that have exited. In this manner, although active child processes are still re-parented to init, the init process is no longer burdened with the task of waiting on such processes when they exit.

19 Claims, 7 Drawing Sheets

SYSTEM AND METHOD TO IMPROVE HARVESTING OF ZOMBIE PROCESSES IN AN OPERATING SYSTEM

BACKGROUND OF THE INVENTION

1. Technical Field

The present invention relates in general to a system and method for harvesting zombie processes in an operating system. More particularly, the present invention relates to a system and method for harvesting zombie processes in a UNIX™ type operating system to improve overall system efficiency.

2. Description of the Related Art

In many multitasking operating systems, when a child process (i.e., a process forked, or spawned, from a "parent" process) exits, it becomes a "zombie" process. This is a requirement of many UNIX™ compatible operating systems, as the child's exit value is saved in the child process' control structures themselves so that the parent process can retrieve it.

In modern computer system environments, application programs are written by a variety of vendors. While these application programs interface extensively with the underlying operating system, the operating system generally provides few constraints on the number of child processes generated by application programs, nor whether the application programs efficiently manage their child processes. As a result, many application programs are written in a manner that inefficiently manages child processes. Consequently, extensive operating system resources are often used to clean up after inefficient, or poorly written, application programs.

While zombie processes provide a means for parent processes to retrieve information about child processes that have exited, an abundance of zombie child processes can burden the operating system. When a parent process never requests its children's exit values (via a "wait" system call), and the parent eventually exits, the child processes are re-parented to and eventually cleaned up, or "harvested," by a standard system process. A standard system process that is often used in a UNIX™ environment is named "init." Because of the functions it performs, the init process is typically a user process (i.e., not a kernel process) and therefore relatively expensive, in terms of system resources, to execute. This is especially true on larger multi-processor (MP) systems where one init process performs functions, including cleaning up after abandoned children, for processes spawned from several different processors.

Figure 1:
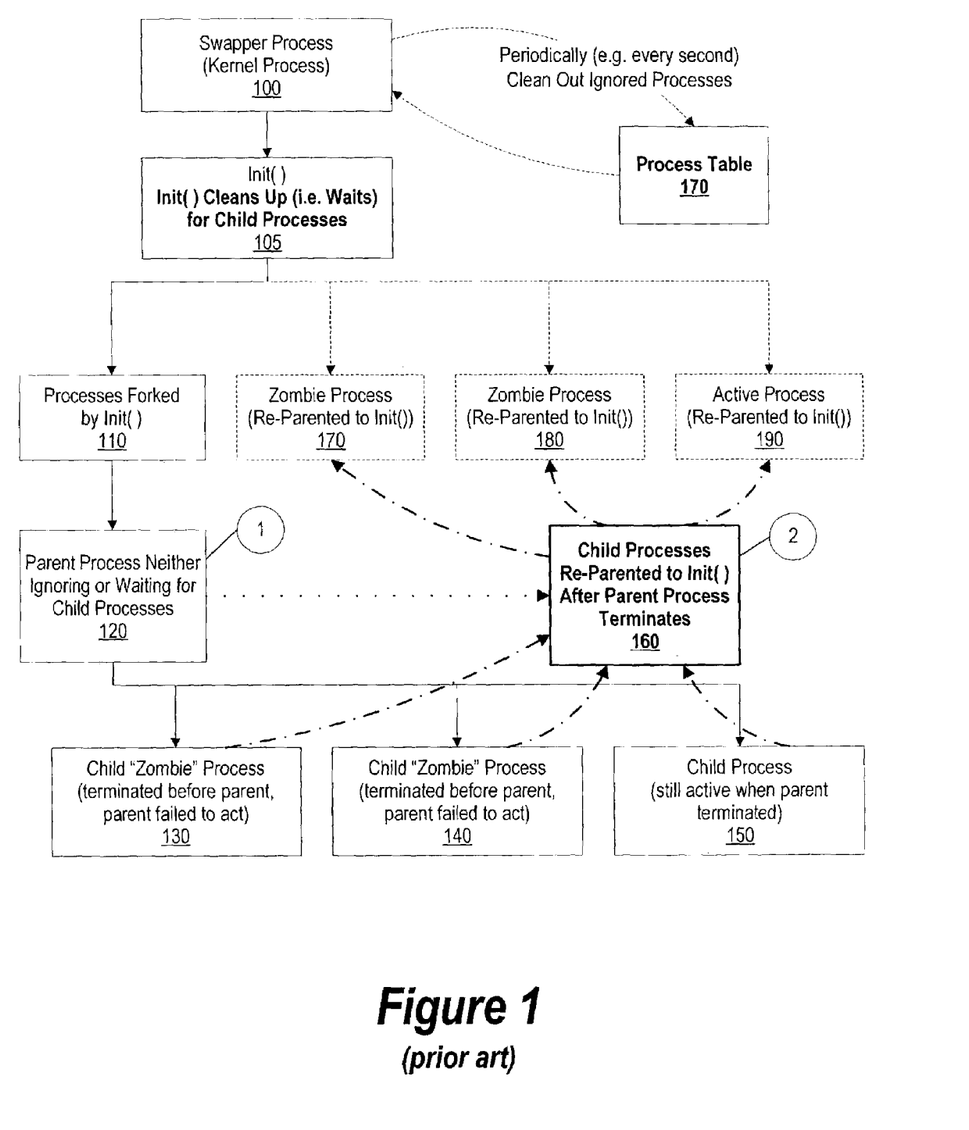
FIG. 1 is a prior art diagram showing the interaction between processes in a traditional UNIX™ type of operating system.

FIG. 1 is a prior art diagram showing the interaction between processes in a traditional UNIX™ type of operating system. Swapper process 100 is a kernel process that, among other functions, periodically cleans processes marked as "ignored" out of process table 170. In a traditional UNIX™ system, the swapper process is the parent process of init process 105. The init process is a user process that forks, or spawns, other system processes, daemons, and user processes.

In the example shown, the processes that have been forked by the init process are represented by block 110. In the example, parent process 120 has been forked by init or some other process. Parent process 120 is neither ignoring exit values from its children nor is the parent process waiting on its children's exit values. In a UNIX™ implementation, a parent process that is ignoring SIGCHLD, the death-of-child signal, is ignoring exit values from its children. As used herein, when a process is said to be "ignoring" its child processes, that process (in a UNIX™ implementation) is ignoring the SIGCHLD signal.

Three child processes of parent process 120 are shown: child processes 130, 140, and 150. In the example, the first two child processes, 130 and 140, are "zombie" processes because the child processes exited before parent process 120 exited and the parent failed to act (i.e., the parent failed to either ignore the return values from the child processes or wait on the child processes). The third child process, process 150, was still active when the parent process exited.

In a traditional UNIX™ system, all three processes are re-parented to init process 105 when the parent terminates. This is shown by routine 160 re-parenting child processes 130, 140, and 150 to init whereby they become child processes 170, 180, and 190, respectively. The init process is now responsible for cleaning up (i.e., waiting on) zombie processes 170 and 180. In addition, when active child process 190 eventually exits, the init process will also clean up (i.e., wait on) process 190 as well.

The example shown in FIG. 1 is a simple example showing a few processes being re-parented to init. In an actual system, a very large number of processes may be re-parented to init causing the init process to spend an excessive amount of time cleaning up child processes that were originally created (i.e., forked) by other processes. The excessive amount of time that init spends cleaning up after child processes can burden the system and degrade performance.

What is needed, therefore, is a system and method for efficiently harvesting zombie processes without overburdening system processes, such as init. What is further needed is a system and method for flagging active child processes whose parents have exited, so that, upon their exit, the child processes can be efficiently cleaned from the system.

SUMMARY

It has been discovered that a kernel exit routine, performed when a process exits, can efficiently remove zombie child processes. The kernel exit routine also re-parents active child processes to a standard system process, such as init.

The kernel exit routine identifies child processes that exited (i.e., terminated) before the parent process. These previously-exited processes are known as "zombies." The kernel exit routine removes the zombie children by calling the internal service used indirectly by the wait system call (as when done by a parent process upon being notified that a child process has exited). In this manner, the zombie children of the exiting parent process are removed without re-parenting the zombie processes to a standard system process, such as init.

Active child processes are flagged, or marked, indicating that the child processes have been re-parented to the standard system process, such as init, rather than having been forked from the standard system process. The active child processes are also re-parented to the standard system process. When a re-parented process exits (i.e., terminates), the kernel exit routine determines that the exiting process was previously re-parented to the standard system process by checking the flag. The exiting process is treated as if the process is being ignored (i.e., no death-of-child signal sent to its parent). A kernel routine, such as the swapper process, periodically cleans up terminated, flagged processes. In this manner, although active child processes are still re-parented to the standard system process, the standard system process is no longer burdened with the task of handling such processes when they exit. In essence, such processes are effectively hidden from the standard system process.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 2A:
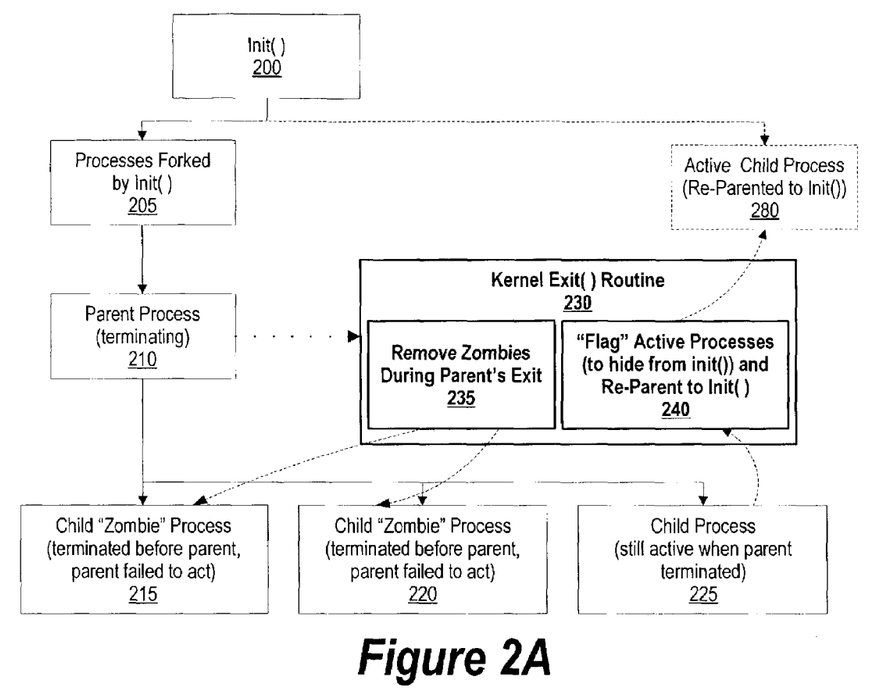
FIG. 2A is a diagram showing a kernel exit routine that handles child processes of an exiting process.

FIG. 2A is a diagram showing a kernel exit routine that handle's child processes of an exiting process. The swapper process (not shown) is the parent process of init process 200. The init process is a user process that forks, or spawns, other system processes, daemons, and user processes. While the init process is used herein, it will be appreciated by those skilled in the art, that a different standard system process might be used in some operating system environments and that some operating system environments may use a name other than "init" for such a standard system process. Therefore, as used herein, "init" means a standard system process that is not necessarily named "init."

In the example shown, the processes that have been forked by the init process are represented by block 205. In the example, parent process 210 has been forked by init or some other process and is in the act of terminating (i.e., exiting). Parent process 210 is neither ignoring exit values from its children nor is the parent process waiting on its children's exit values. Three child processes of parent process 210 are shown: child processes 215, 220, and 225.

In the example, the first two child processes, 215 and 220, are "zombie" processes because the child process exited before parent process 210 exited and the parent failed to act (i.e., parent 210 failed to either ignore the return values from the child processes or wait on the child processes). The third child process, process 225, was still active when the parent process exited.

Unlike a traditional UNIX™ system, when parent process 210 exits without acting upon its child processes, kernel exit routine 230 handles the child processes with little or no involvement by init. Subroutine 235 of kernel exit routine 230 removes child "zombie" processes (i.e., child processes of the exiting parent process that exited before the parent). Subroutine 240 of kernel exit routine 230 flags, or marks, active child processes of the exiting parent process and re-parents the active child processes to init. When the re-parented active process eventually exits, the kernel exit routine checks the flag and effectively removes flagged processes without burdening init with the task of waiting on such child processes. In other words, even though the active child process has been re-parented to init, init has little or no direct involvement in cleaning up after the process when it exits. In one embodiment, the kernel exit routine leaves the processes on the process list and the swapper process actually removes the flagged processes from the system.

Figure 2B:
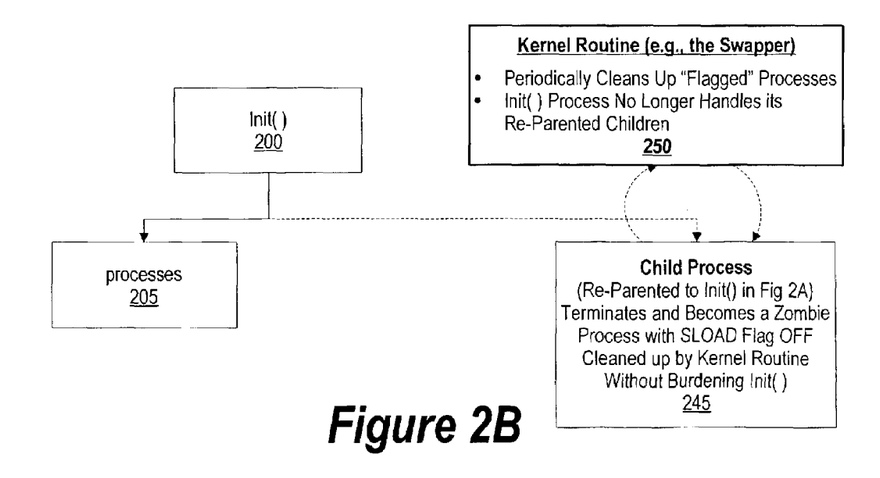
FIG. 2B is a diagram showing another kernel routine that periodically cleans up flagged processes that were identified by the kernel exit routine in FIG. 2A.

FIG. 2B is a diagram showing another kernel routine that periodically cleans up flagged processes that were identified by the kernel exit routine in FIG. 2A. This figure is substantially similar to FIG. 2A and shows processes that exist after kernel exit routine 230 cleaned up zombie processes 215 and 220 and re-parented active process 225 to a standard system process, such as init (thus becoming child process 245 of init).

In this example, re-parented child process 245 is exiting. Because this process was previously flagged by kernel exit subroutine 240, the process is cleaned up by another kernel routine 250, such as the swapper, rather than init.

In one embodiment, kernel routine 250 is performed by the swapper process. In this embodiment, child process 245 becomes a zombie process with a specific UNIX™ flag (SLOAD) turned OFF. Kernel exit routine 250 periodically (e.g., once every second) removes zombie processes identified by having their SLOAD flags turned off.

Figure 3:
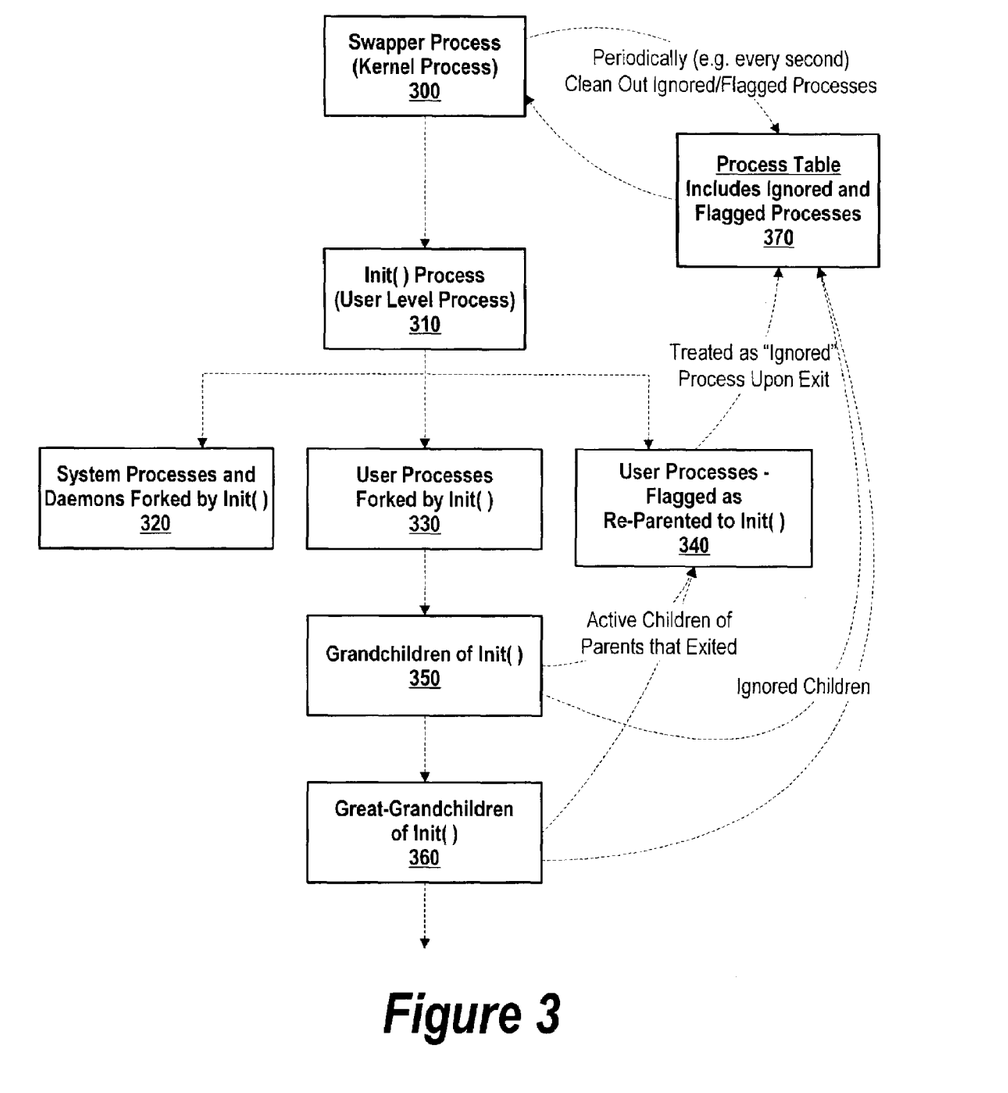
FIG. 3 is a hierarchy diagram showing system processes and their child processes and the clean up of child processes following the exit of the children's respective parents.

FIG. 3 is a hierarchy diagram showing system processes and their child processes and the clean up of child processes following the exit of the children's respective parents. Swapper process 300 is a kernel process that forks init process 310. In addition, swapper process 300 periodically (e.g., once every second) cleans out flagged processes.

In one embodiment, processes, including ignored and flagged processes, are listed in process table 370. In this embodiment, swapper process 300 identifies zombie processes that are ignored or that have been flagged by checking the process' SLOAD flag which is included in process table 370. If the SLOAD flag is OFF and the process is a zombie (i.e., has exited), then the swapper removes the corresponding process from the process table and cleans out data associated with the process.

Init process 310 is a user level process from which other processes are forked. In the example shown, the init process has forked system processes and daemons 320 and user processes 330. In addition, the init process is identified as the parent of active processes 340 whose original parents exited (i.e., terminated) before the child processes exited.

As shown, these active processes used to be grandchildren 350, great-grandchildren 360, etc. of the init process but were re-parented to init when the processes' original parents exited (terminated). When the processes are re-parented to init, a flag is set for each process indicating that these processes have been re-parented to init. In effect, the flag indicates that the original parents of the re-parented processes are no longer available to handle any return values or states upon the exit of these re-directed processes.

The flagged re-parented processes are treated as if they are being ignored by their new parent (init). Consequently, when re-parented processes exit, the swapper process periodically removes them from process table 370 and cleans out any data associated with the exited re-parented processes. Also, because the flagged, re-parented processes are treated as if they are being ignored, init process 310 is not burdened with cleaning up after (i.e., waiting on) the processes when the processes exit.

Figure 4:
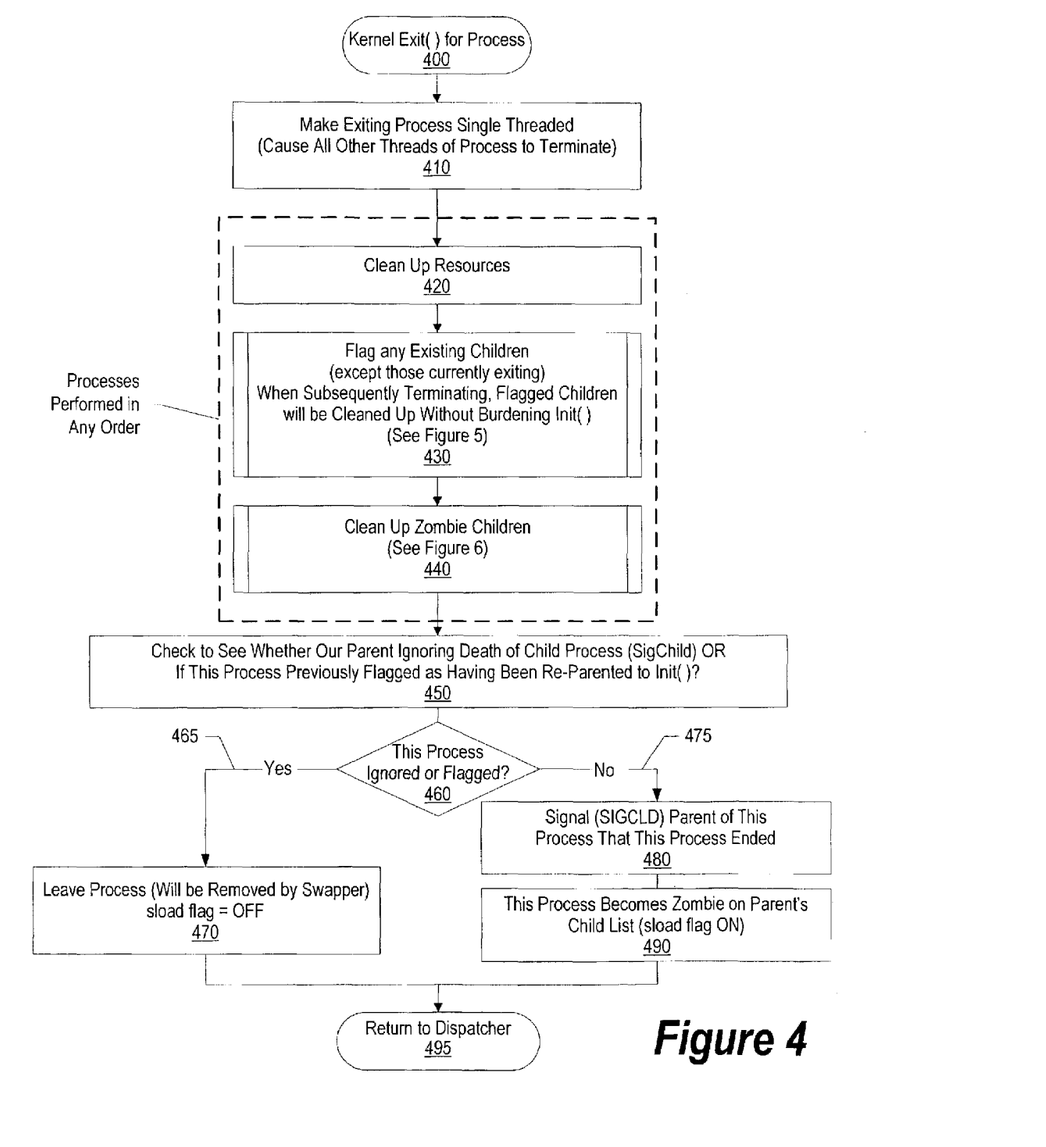
FIG. 4 is a high level flowchart showing the steps taken by the kernel exit routine.

FIG. 4 is a high level flowchart showing the steps taken by the kernel exit routine. When a process exits, a kernel exit routine is performed. Processing of the kernel exit routine commences at 400 whereupon the exiting process is made single-threaded (step 410) causing all other threads of the process to terminate.

Three activities are performed to clean up resources and child processes. As noted in FIG. 4, these activities can be performed in any order. High level resources, such as allocated structures that need to be released and files that need to be closed, are cleaned up in step 420. Existing, active (i.e., non-exiting), child processes are flagged and re-parented to a standard system process, such as init (predefined process 430, see FIG. 5 and corresponding text for processing details). When these child processes eventually exit they will be cleaned up without burdening init. In addition, zombie child processes of the exiting process are cleaned up (predefined process 440, see FIG. 6 and corresponding text for processing details). These zombie child processes are child processes that exited before the parent process exited and were not acted upon (i.e., ignored or waited on) by the parent process. Because the parent is now exiting, it is safe to remove the zombie children from the process table and clean up any data associated with the zombie children.

A check is made to determine whether the parent of the exiting process has requested to ignore the termination of this process or whether the exiting process was previously flagged as having been re-parented to init (step 450). Based on this check, a determination is made as to whether the exiting process is being ignored or has been flagged as re-parented to init (decision 460). If the process is being ignored or was re-parented to init, decision 460 branches to "yes" branch 465 whereupon the process is left on the process table as a zombie process with its SLOAD flag turned OFF. The swapper process will periodically check the process table and remove zombie processes, including this process, that have their SLOAD flags turned off.

On the other hand, if the exiting process is not being ignored by its parent process and the process has not been re-parented to init, then decision 460 branches to "no" branch 475 whereupon a signal is sent to the parent of the exiting process notifying the parent that the process has exited (step 480). The parent process might then retrieve return values (i.e., using a wait call) that were set by the exiting process before it terminated. If the parent does not wait on the exiting child process, then the process becomes a zombie process on the parent process' child list (step 490). The zombie process' SLOAD flag is ON so that the swapper will not remove the process from the process table. If the parent process subsequently exits without acting on the zombie child process, the zombie child process will be cleaned up in predefined process 440 when performed during the parent process' exit.

After either leaving the exiting process on the process table or having the exiting process become a zombie on its parent process' child list, processing returns to the dispatcher at 495.

Figure 5:
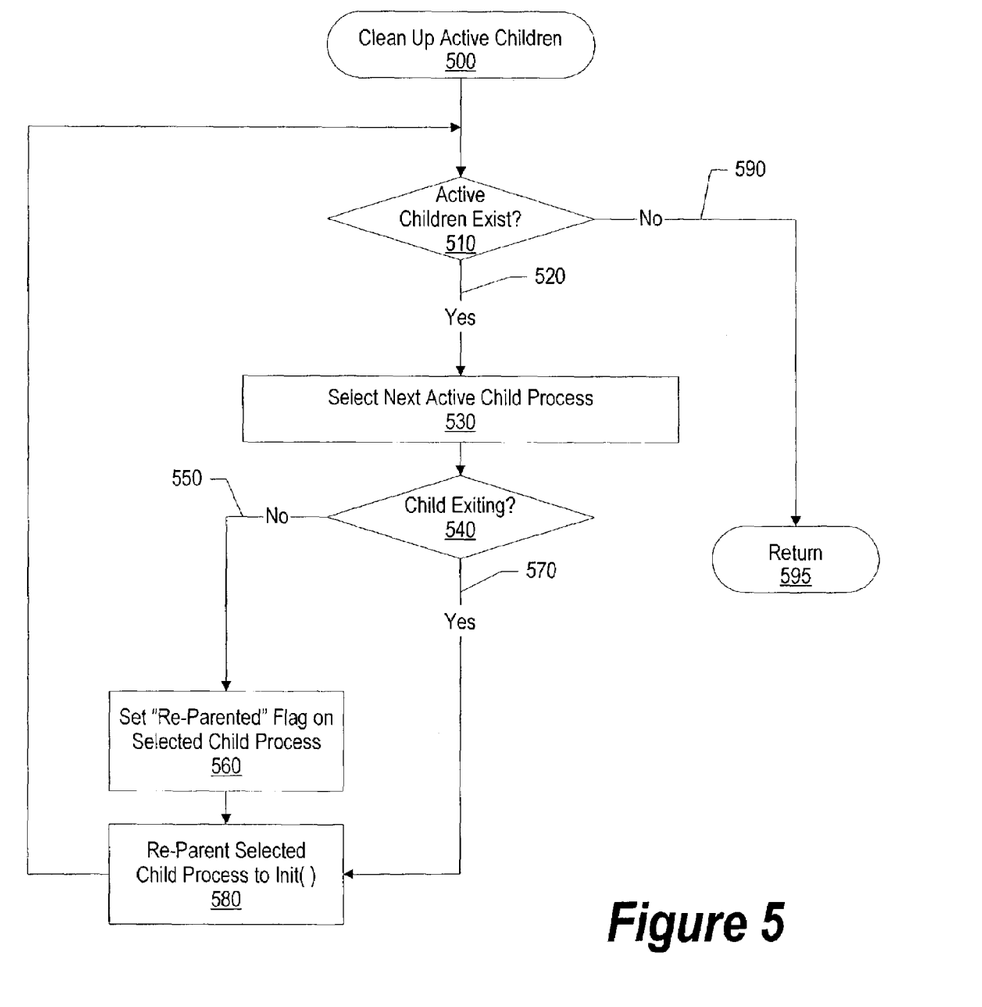
FIG. 5 is a flowchart showing the steps taken to clean up active child processes during the kernel exit routine.

FIG. 5 is a flowchart showing the steps taken to clean up active child processes during the kernel exit routine. Processing commences at 500 whereupon a determination is made as to whether active (i.e., non-zombie) child processes exist that correspond to the exiting process (decision 510). If there are one or more active child processes that correspond to the exiting process, decision 510 branches to "yes" branch 520 whereupon the next active child process is selected (step 530).

A determination is made as to whether the selected child process is currently exiting (decision 540). If the selected child process is not currently exiting, decision 540 branches to "no" branch 550 whereupon a re-parented flag is set for the selected child process (step 560), and the selected process is re-parented to the init process (step 580). In one embodiment, the re-parented flag is in a process table that includes entries for processes currently existing in the system. On the other hand, if the child process is in the act of exiting, decision 540 branches to "yes" branch 570 whereupon the selected child process is re-parented to the init process (step 580), but the re-parented flag is not set (step 560).

Processing then loops back to determine whether there are more active processes that need to be re-parented to the init process. This looping continues until no more active child processes exist for the exiting process, at which point, decision 510 branches to "no" branch 590 and processing returns at 595.

Figure 6:
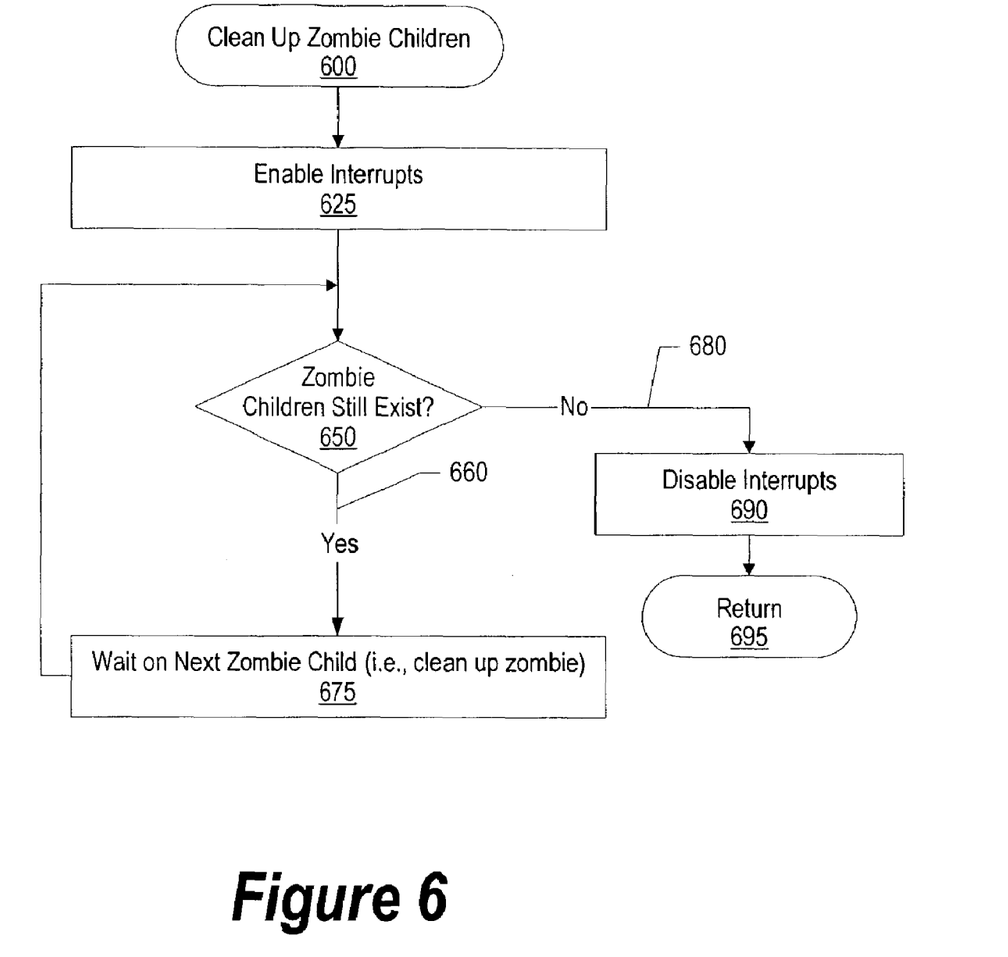
FIG. 6 is a flowchart showing the steps taken to clean up zombie child processes during the kernel exit routine.

FIG. 6 is a flowchart showing the steps taken to clean up zombie child processes during the kernel exit routine. Zombie child processes are child processes that have exited before the parent exited but have not been acted upon by the parent (i.e., the parent has not waited on the child process nor did the parent request that return values from the child process be ignored).

Processing commences at 600 whereupon interrupts are enabled (step 625). A determination is made as to whether any zombie child processes exist for the exiting process (decision 650). If any zombie child processes exist, decision 650 branches to "yes" branch 660 whereupon the next zombie child process is waited upon (step 675). When a zombie child process is waited upon, the kernel "waits" by calling the internal service used indirectly by the same wait system call that is performed by a parent process when the parent wants to receive the child's exit values. When the zombie child process is waited upon, it is cleaned up and removed from the process table (i.e., the list of active processes).

Processing loops back to determine if there are any more zombie child processes that need to be waited upon. This looping continues until all zombie child processes have been waited upon, at which point, decision 650 branches to "no" branch 680. Interrupts for the exiting process are disabled (step 690) and processing returns at 695.

Figure 7:
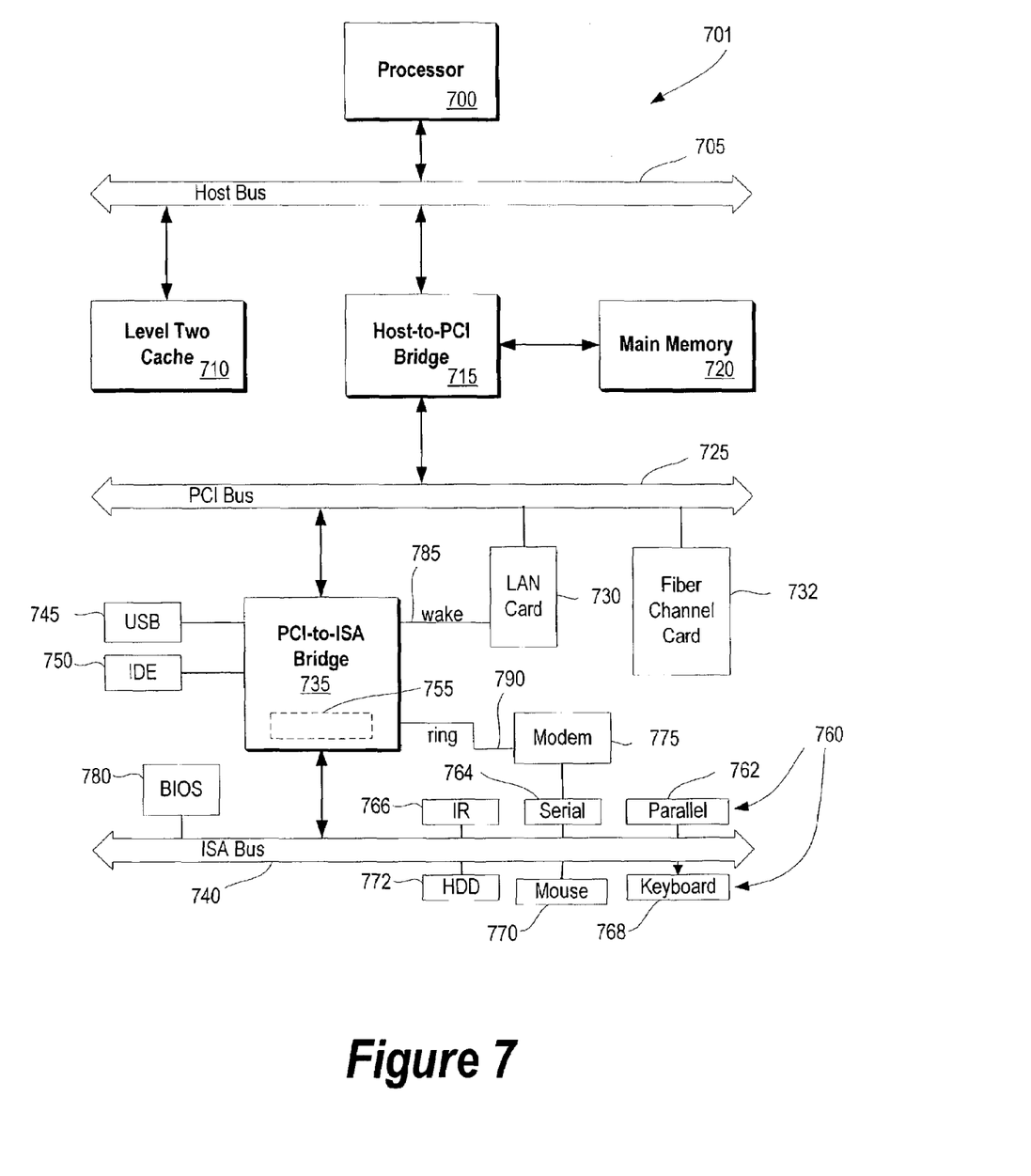
FIG. 7 is a block diagram of a computing device capable of implementing the translation of normalized position settings to vehicle-specific settings and vice-versa.

FIG. 7 illustrates information handling system 701 which is a simplified example of a computer system capable of performing the systems and methods described herein. Computer system 701 includes processor 700 that is coupled to host bus 705. A level two (L2) cache memory 710 is also coupled to the host bus 705. Host-to-PCI bridge 715 is coupled to main memory 720, includes cache memory and main memory control functions, and provides bus control to handle transfers among PCI bus 725, processor 700, L2 cache 710, main memory 720, and host bus 705. PCI bus 725 provides an interface for a variety of devices including, for example, LAN card 730. PCI-to-ISA bridge 735 provides bus control to handle transfers between PCI bus 725 and ISA bus 740, universal serial bus (USB) functionality 745, IDE device functionality 750, power management functionality 755, and can include other functional elements not shown, such as a real-time clock (RTC), DMA control, interrupt support, and system management bus support. Peripheral devices and input/output (I/O) devices can be attached to various interfaces 760 (e.g., parallel interface 762, serial interface 764, infrared (IR) interface 766, keyboard interface 768, mouse interface 770, and fixed disk (FDD) 772 coupled to ISA bus 740. Alternatively, many I/O devices can be accommodated by a super I/O controller (not shown) attached to ISA bus 740.

BIOS 780 is coupled to ISA bus 740 and incorporates the necessary processor executable code for a variety of low-level system functions and system boot functions. BIOS 780 can be stored in any computer readable medium, including magnetic storage media, optical storage media, flash memory, random access memory, read only memory, and communications media conveying signals encoding the instructions (e.g., signals from a network). In order to attach computer system 701 another computer system to copy files over a network, LAN card 730 is coupled to PCI-to-ISA bridge 735. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of handling an exit request in an operating system that includes a plurality of processes, said method comprising:

receiving the exit request for an exiting process, the exiting process being one of the plurality of processes;

identifying one or more zombie processes that are child processes of the exiting process, wherein at least one of the zombie processes is being acknowledged by the exiting process, wherein a signal handler is not established corresponding to the exiting process in order to handle child processes that have exited, and wherein a flag that indicates that the exiting process is not interested in obtaining status information on child processes that have exited is not set;

removing each of the identified zombie processes from the computer system without re-parenting the identified zombie processes;

identifying one or more active processes that are child processes of the exiting process;

setting a re-parented flag for each of the identified active processes;

re-parenting each of the identified active processes to a standard system process;

receiving a subsequent exit request from one of the re-parented processes;

determining that the re-parented flag has been set for the exiting re-parented process; and removing the exiting re-parented process from the computer system in response to the determination, wherein the removing is performed by a second standard system process and does not impact the performance of the standard system process.

2. The method of claim 1 wherein the standard system process is a non-kernel process and wherein the second standard system process is a kernel process.

3. The method of claim 1 wherein the standard system process is an init process and wherein the second standard system process is a swapper process.

4. The method of claim 1 wherein the removing includes waiting on each of the identified zombie processes.

5. The method of claim 1 further comprising:

determining that the exiting process has been re-parented, indicating that an original parent process of the exiting process has already exited;

leaving the exiting process in a process table with a flag set indicating that the exiting process is being ignored in response to determining that the exiting process has been re-parented; and freeing resources assigned to the exiting process, the freeing performed by a kernel process that checks the process table periodically.

6. The method of claim 1 further comprising:

determining that the exiting process has not been re-parented, indicating that an original parent process of the exiting process is still active, and determining that the exiting process not being ignored by the original parent process; and in response to the determinations: signaling the original parent process that the exiting process has exited; and changing one more values corresponding to the exiting process so that the exiting process becomes a zombie child process on a child process list that corresponds to the original parent process.

7. An information handling system comprising:

one or more processors;

a memory accessible by the processors;

an operating system that manages the information handling system, the operating system including a plurality of processes;

an exit tool to manage exiting processes, the exit tool being effective to;

receive an exit request for an exiting process, the exiting process being one of the plurality of processes;

identify one or more zombie processes that are child processes of the exiting process, wherein at least one of the zombie processes is being acknowledged by the exiting process, wherein a signal handler is not established corresponding to the exiting process in order to handle child processes that have exited, and wherein a flag that indicates that the exiting process is not interested in obtaining status information on child processes that have exited is not set; and remove each of the identified zombie processes from the computer system without re-parenting the identified zombie processes;

identify one or more active processes that are child processes of the exiting process;

set a re-parented flag for each of the identified active processes;

re-parent each of the identified active processes to a standard system process;

receive a subsequent exit request from one of the re-parented processes;

determine that the re-parented flag has been set for the exiting re-parented process; and remove the exiting re-parented process from the computer system in response to the determination, wherein the removing is performed by a second standard system process and does not impact the performance of the standard system process.

8. The method of claim 7 wherein the standard system process is a non-kernel process and wherein the second standard system process is a kernel process.

9. The method of claim 7 wherein the standard system process is an init process and wherein the second standard system process is a swapper process.

10. The information handling system of claim 7 wherein, to remove the zombie processes, the exit tool is further effective to wait on each of the identified zombie processes.

11. The information handling system of claim 7, wherein the exit tool is further effective to:

determine that the exiting process has been re-parented, indicating that an original parent process of the exiting process has already exited;

leave the exiting process in a process table with a flag set indicating that the exiting process is being ignored in response to determining that the exiting process has been re-parented; and free resources assigned to the exiting process, the freeing performed by a kernel process that checks the process table periodically.

12. The information handling system of claim 7, wherein the exit tool is further effective to:

determine that the exiting process has not been re-parented, indicating that an original parent process of the exiting process is still active, and determine that the exiting process is not being ignored by the original parent process; and in response to the determinations:

signal the original parent process that the exiting process has exited; and change one more values corresponding to the exiting process so that the exiting process becomes a zombie child process on a child process list that corresponds to the original parent process.

13. A computer program product stored in a computer readable medium, comprising instructions that, when executed by an information handling system, causes the information handling system to perform actions comprising:

receiving the exit request for an exiting process, the exiting process being one of the plurality of processes;

identifying one or more zombie processes that are child processes of the exiting process, wherein at least one of the zombie processes is being acknowledged by the exiting process, wherein a signal handler is not established corresponding to the exiting process in order to handle child processes that have exited, and wherein a flag that indicates that the exiting process is not interested in obtaining status information on child processes that have exited is not set;

removing each of the identified zombie processes from the computer system without re-parenting the identified zombie processes;

identifying one or more active processes that are child processes of the exiting process;

setting a re-parented flag for each of the identified active processes;

re-parenting each of the identified active processes to a standard system process receiving a subsequent exit request from one of the re-parented processes;

determining that the re-parented flag has been set for the exiting re-parented process; and removing the exiting re-parented process from the computer system in response to the determination, wherein the means for removing is performed by a second standard system process and does not impact the performance of the standard system process.

14. The method of claim 13 wherein the standard system process is a non-kernel process and wherein the second standard system process is a kernel process.

15. The method of claim 13 wherein the standard system process is an init process and wherein the second standard system process is a swapper process.

16. The computer program product of claim 13 wherein the instructions that perform the removing include additional instructions that, when executed by the information handling system, perform additional actions that include waiting on each of the identified zombie processes.

17. The computer program product of claim 13 wherein the instructions, when executed by the information handling system, cause the information handling system to perform additional actions comprising:

determining that the exiting process has been re-parented, indicating that an original parent process of the exiting process has already exited;

leaving the exiting process in a process table with a flag set indicating that the exiting process is being ignored in response to determining that the exiting process has been re-parented; and freeing resources assigned to the exiting process, the freeing performed by a kernel process that checks the process table periodically.

18. The computer program product of claim 13 wherein the instructions, when executed by the information handling system, cause the information handling system to perform additional actions comprising:

determining that the exiting process has not been re-parented, indicating that an original parent process of the exiting process is still active, and determining that the exiting process is not being ignored by the original parent process; and in response to the determinations:
  signaling the original parent process that the exiting process has exited; and
  changing one more values corresponding to the exiting process so that the exiting process becomes a zombie child process on a child process list that corresponds to the original parent process.

19. A method of handling an exit request in an operating system that includes a plurality of processes, said method comprising:

receiving the exit request for an exiting process, the exiting process being one of the plurality of processes;

identifying one or more zombie processes that are child processes of the exiting process, wherein at least one of the zombie processes is being acknowledged by the exiting process, wherein a signal handler is not established corresponding to the exiting process in order to handle child processes that have exited, and wherein a flag that indicates that the exiting process is not interested in obtaining status information on child processes that have exited is not set;

removing each of the identified zombie processes from the computer system without re-parenting the identified zombie processes;

determining that the exiting process has not been re-parented, indicating that an original parent process of the exiting process is still active, and determining that the exiting process is not being ignored by the original parent process; and in response to the determinations:
  signaling the original parent process that the exiting process has exited; and
  changing one more values corresponding to the exiting process so that the exiting process becomes a zombie child process on a child process list that corresponds to the original parent process.

* * * * *